United States Patent [19]

Tsutsui et al.

[11] Patent Number: 5,782,711
[45] Date of Patent: Jul. 21, 1998

[54] HYDRAULIC PRESSURE CONTROL APPARATUS FOR AN AUTOMATIC TRANSMISSION

[75] Inventors: Hiroshi Tsutsui, Nishio; Kazumasa Tsukamoto, Toyota; Masahiro Hayabuchi; Masaaki Nishida, both of Anjo; Yoshihisa Yamamoto, Nishio; Toshihiro Kano, Anjo; Takayuki Kubo, Nishio; Saoto Tsuchiya, Anjo, all of Japan

[73] Assignee: Aisin AW Co., Ltd., Japan

[21] Appl. No.: 768,462

[22] Filed: Dec. 18, 1996

[30] Foreign Application Priority Data

Dec. 19, 1995 [JP] Japan ................................ 7-330895

[51] Int. Cl.$^6$ .................................................. F16H 5/40
[52] U.S. Cl. .......................... 477/156; 477/159; 477/143
[58] Field of Search ................................ 477/120, 121, 477/143, 156, 159, 904

[56] References Cited

U.S. PATENT DOCUMENTS

| | | | |
|---|---|---|---|
| 5,505,673 | 4/1996 | Tsukamoto et al. | 477/143 X |
| 5,573,478 | 11/1996 | Tsukamoto et al. | 477/143 X |
| 5,653,660 | 8/1997 | Tsukamoto et al. | 477/156 X |
| 5,685,803 | 11/1997 | Furukawa et al. | 477/156 X |
| 5,692,990 | 12/1997 | Tsukamoto et al. | 477/901 X |
| 5,697,864 | 12/1997 | Watanabe | 477/120 X |
| 5,702,322 | 12/1997 | Sunada et al. | 477/120 |

*Primary Examiner*—Charles A. Marmoh
*Assistant Examiner*—Peter T. Kwon
*Attorney, Agent, or Firm*—Lorusso & Loud

[57] ABSTRACT

A hydraulic pressure control apparatus for an automatic transmission including a microprocessor-based control unit for controlling hydraulic pressure supplied to hydraulic servos of friction engagement elements. The control apparatus calculates a target hydraulic pressure $P_{TA}$ for a condition at the start of the inertia phase in accordance with the input torque, and a gradient based on the target hydraulic pressure and a predetermined time $t_{TA}$. A first up-sweep of hydraulic pressure is performed by the apparatus with the gradient. A relatively gradual gradient $\delta P_{TA}$ is set based on a target rotation change rate for the input rotational speed to provide a predetermined change amount when the hydraulic pressure becomes the target hydraulic pressure $P_{TA}$. The control apparatus performs a second up-sweep with the gradient $\delta P_{TA}$. When the rotational speed change $\Delta N$ of the input rotation becomes a rotation change start-determining rotational speed $dN_S$, the control apparatus feedback-controls the hydraulic pressure with a predetermined gradient while referring to the input rotation change. Further, the control apparatus detects the target shift start time and the rotational speed change rate at the target shift start time to correct the target hydraulic pressure $P_{TA}$, the gradient $\delta P_{TA}$ of the second sweep section, and the target shift start time $t_{aim}$.

11 Claims, 14 Drawing Sheets

FIG. 6(a)
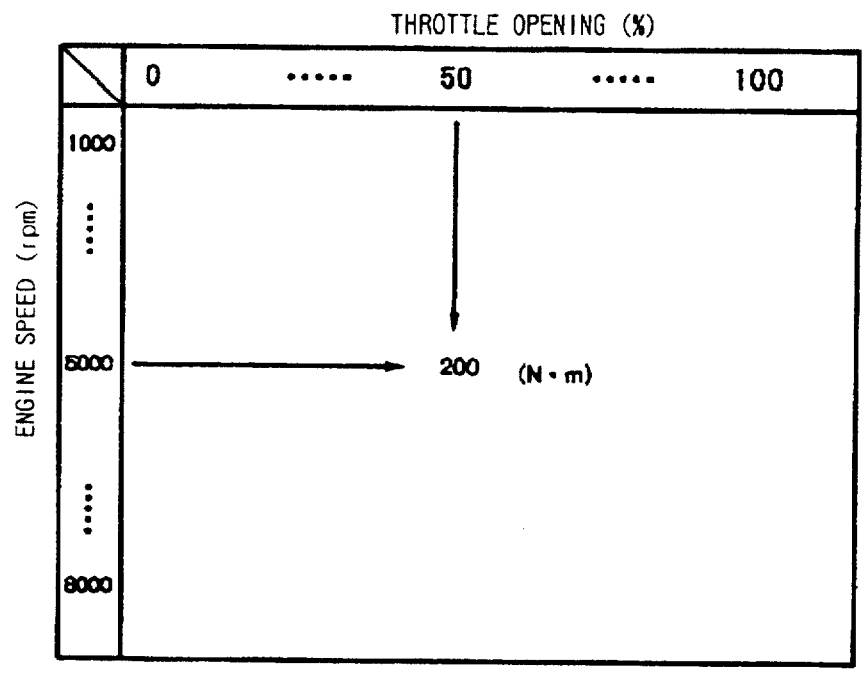
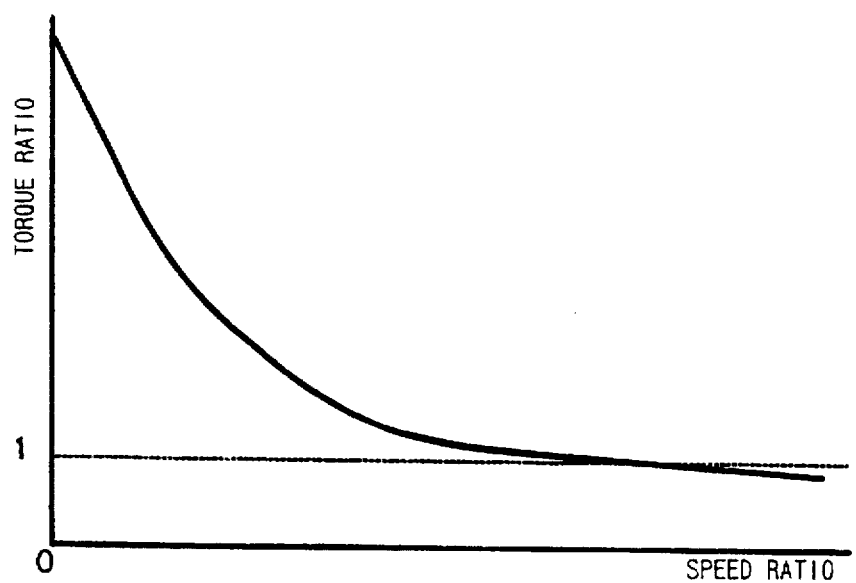
FIG. 6(b)

taim : TARGET SHIFT START TIME
$t_1$ : TARGET SHIFT TIME $P_{TA} = P_{TA} + \Delta P_0$
$\delta P_{TA} = \delta P_{TA} + \Delta \delta P_0$
$taim = taim + \Delta t_0$

HYDRAULIC PRESSURE CONTROL APPARATUS FOR AN AUTOMATIC TRANSMISSION

BACKGROUND OF THE INVENTION

1. Field of the Invention

The present invention relates to a hydraulic pressure control apparatus for an automatic transmission of a vehicle and, more particularly, to an apparatus that controls hydraulic pressure supplied to hydraulic servos for changing transmission paths of an automatic shift mechanism.

2. Related Art

An apparatus for reducing transmission shift shock by controlling hydraulic pressure is disclosed in Japanese patent application laying-open No. SHO-63-270971. The apparatus disclosed therein calculates a turbine (input) torque occurring immediately before the output of a shift signal using a turbine torque estimating means and turbine torque correcting means. Based on the calculated turbine torque and the gear ratios before and after the shift, the apparatus estimates a turbine torque that will be caused at the gear ratio after the shift. Using this estimate, the apparatus controls a fluid pressure regulating means for regulating the fluid pressure on hydraulic servos so that the turbine torque will smoothly change.

Although the above-mentioned control apparatus may detect a turbine torque with a high precision and estimate an accurate turbine torque occurring after a shift, the apparatus cannot calculate a precise hydraulic pressure from the estimated turbine torque due to variations in the μ characteristics of the friction members, piston stroke errors, and the like. Accordingly, if the acting hydraulic pressure calculated by the apparatus is high relative to a proper hydraulic pressure, a drop of the rotational change during the beginning period of the inertia phase becomes large and causes a shift shock. If the acting hydraulic pressure is low relative to the proper hydraulic pressure, the start of the inertia phase is delayed. This causes a prolonged shift process followed by a sharp change in rotational speed, also producing shift shock.

SUMMARY OF THE INVENTION

Accordingly, it is an object of the present invention to provide a control apparatus of an automatic transmission that reduces shift shock by supplying controlled hydraulic pressure gradients to the friction engagement elements of the transmission.

This and other objects of the invention are achieved by a hydraulic pressure control apparatus for controlling an automatic transmission of a vehicle including an automatic shift mechanism, changeover valves, pressure regulators, and a control unit. The automatic shift mechanism changes a transmission input shaft rotational speed over transmission paths by engaging and disengaging a plurality of friction engagement elements through operation of hydraulic servos. Hydraulic pressure to the hydraulic servos is regulated by the pressure regulators, preferably linear solenoids. The changeover valves (or shift valves) supply the regulated hydraulic pressure to, or discharge it from, the hydraulic servos to engage and disengage the friction engagement elements.

To control hydraulic pressure to the servos, the microprocessor-based control unit generates feedback-controlled electrical outputs to the pressure regulators. The control unit includes: input torque calculation means, target hydraulic pressure calculation means, and hydraulic pressure control means.

The input torque calculation means calculates an input torque of the input shaft based on a running condition of the vehicle. The input torque, thus calculated, is supplied to the target hydraulic pressure calculation means for calculating a target hydraulic pressure, for a condition immediately before the input rotational speed starts to change. The hydraulic pressure control means outputs a signal to the pressure regulators to provide a first sweep section of hydraulic fluid and to change the hydraulic pressure to the target hydraulic pressure with a predetermined first gradient. The control means then initiates a second sweep section of hydraulic fluid where the hydraulic pressure is changed from the target hydraulic pressure with a second gradient that is less than the predetermined first gradient.

Preferably, the first sweep section is provided for a predetermined time established in consideration of a hydraulic pressure response delay. The predetermined first gradient is established on the basis of the predetermined time and the target hydraulic pressure. The second sweep section is established on the basis of a target rotation change rate that occurs when the input rotational speed changes by a predetermined amount. The second sweep section extends until the rotational speed change of the input rotation becomes a rotation change start-determining rotational speed.

In an inertia phase, the hydraulic pressure control apparatus uses as a target value a rotation change rate of the input rotational speed. The hydraulic pressure control means is set so that the target value gradually changes during beginning and ending periods of said inertia phase. The hydraulic pressure control apparatus measures the time of the second sweep section, and corrects the target hydraulic pressure in accordance with the measured time.

At the end of the second sweep section the hydraulic pressure control apparatus detects a rotational speed change rate of the input rotational speed, and corrects the gradient of the second sweep section in accordance with the detected change rate. The duration of the second sweep section is then compared with the predetermined time established in consideration of a hydraulic pressure response delay. The control apparatus corrects the target hydraulic pressure and the gradient of the second sweep section based on the comparison.

Also, the control apparatus supplies hydraulic pressure to the hydraulic servos so that the hydraulic servos will complete a piston stroke before the first sweep section starts. The apparatus detects a rotational speed change rate of the input rotational speed and a time of the second sweep section at end of the second sweep section. The piston stroke time of the hydraulic servos is corrected in accordance with the detected rotational speed change rate and the detected time.

The friction engagement elements that are engaged and disengaged may include two friction engagement elements that are simultaneously operated. The pressure to a first hydraulic servo of a first one of the friction engagement elements is controlled by the control unit as described above. The hydraulic servo for the second one of the two friction engagement elements is controlled on the basis of a hydraulic pressure calculated using a predetermined relational equation that depends on the hydraulic pressure of the first hydraulic servo. The relational equation is related to a predetermined coefficient established in accordance with a tie-up degree of the first and second friction engagement elements.

BRIEF DESCRIPTION OF THE DRAWINGS

A preferred embodiment of the invention is described below with reference to the following figures wherein like numerals represent like parts:

FIG. 6(a) indicates a map of the stroke opening and the engine speed for calculating torque according to the invention.

FIG. 6(b) indicates a map of the torque ratio and the speed ratio for calculating torque according to the invention.

DETAILED DESCRIPTION OF THE PREFERRED EMBODIMENT

Figure 1:
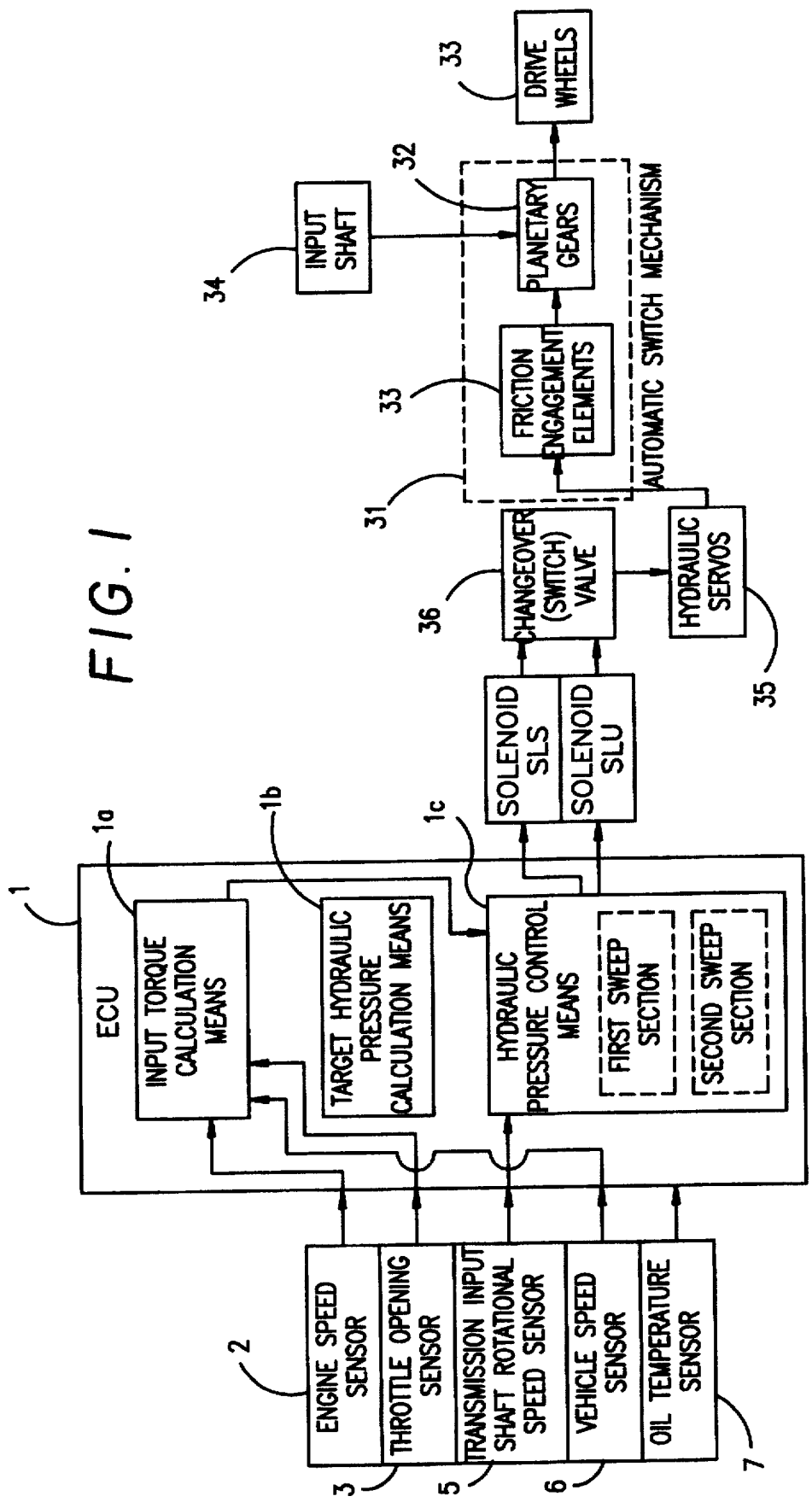
FIG. 1 is block diagram of an apparatus according to the present invention.

Preferred embodiments of the present invention will now be described with reference to the accompanying drawings. As shown in FIG. 1, the present invention is useful in connection with an automatic transmission (automatic shift apparatus) which includes an changeover valves 36, hydraulic servos 37, and an automatic shift mechanism 31. The changeover valves 36 supply controlled hydraulic pressure to the hydraulic servos 37 for engaging and disengaging a plurality of friction engagement elements 33 of the automatic switch mechanism 31. The input shaft 34 of the automatic shift mechanism is connected to the output shaft of a torque converter (not shown), and the output shaft is connected to the vehicle drive wheels 35. Responsive to the controlled operation of the friction engagement elements, the automatic shift mechanism selects a transmission path through planetary gears 32.

According to the present invention, control of the automatic transmission is achieved through an engine control unit 1 (ECU). The control unit 1 includes a microcomputer for performing system control calculations using preset constants and input signals from an engine speed sensor 2, a throttle opening sensor 3, a transmission input shaft rotational speed (turbine rotational speed) sensor 5, a vehicle speed (=transmission output shaft rotational speed) sensor 6, and an oil temperature sensor 7. Outputs of the control unit are provided to linear solenoid valves SLS, SLU.

Means 1a for calculating an input torque based on signals from the engine speed sensor 2, the throttle opening sensor 3 and the vehicle speed sensor 6, are included within the control unit. The output of the input torque calculation means 1a is provided as an input to means 1b for calculating a target hydraulic pressure, in accordance with the calculated input torque, for a condition immediately before the start of the transmission inertia phase. Outputs of the input torque calculations means 1a and the target hydraulic pressure calculation means 1b are provided to hydraulic pressure control means 1c along with a signal from the transmission input shaft rotational speed sensor 5. The hydraulic pressure control means outputs signals to pressure regulators, preferably linear solenoid valves SLS, SLU, to achieve predetermined changing of hydraulic pressure using a first sweep section and a second sweep section.

Figure 2:
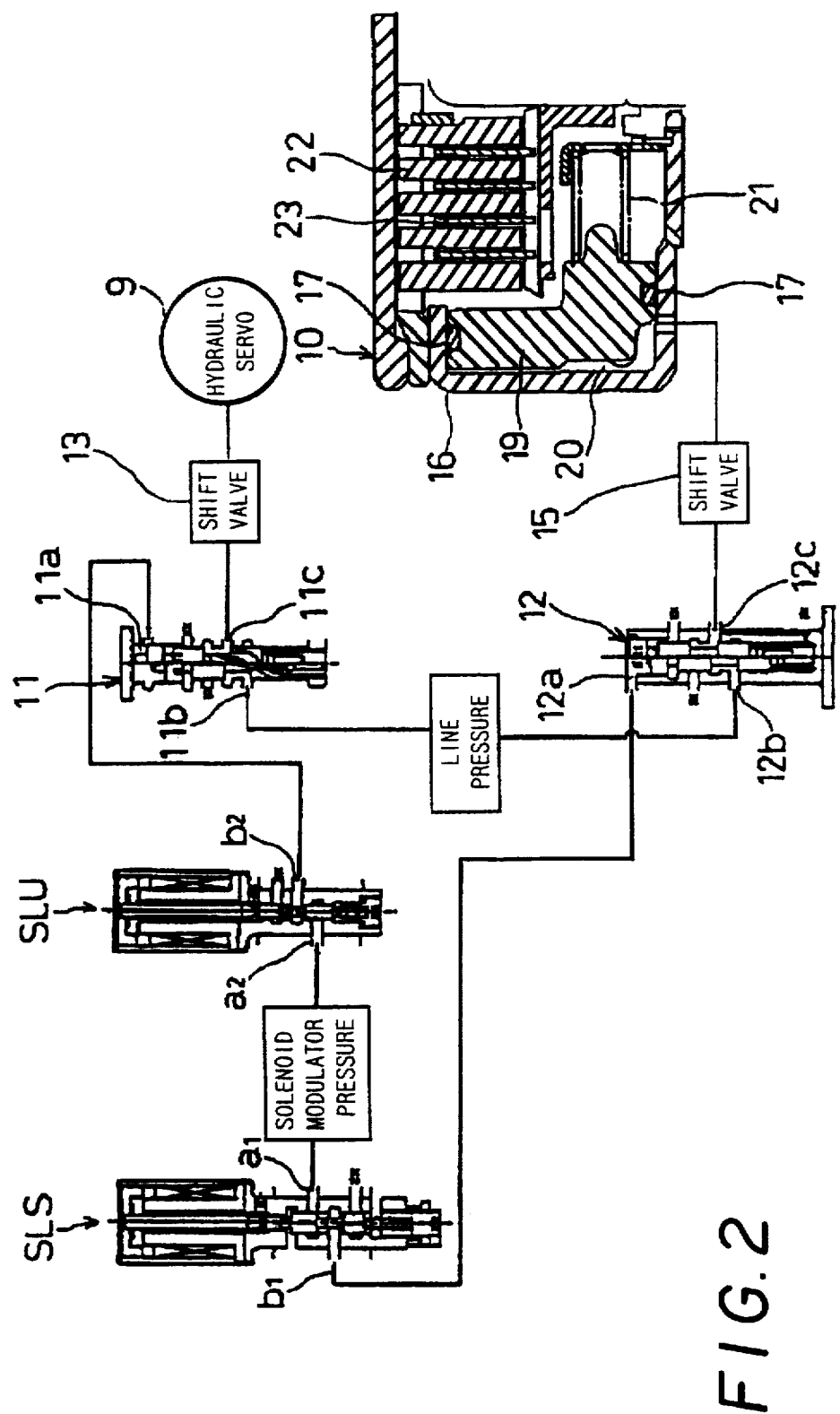
FIG. 2 schematically shows a hydraulic circuit according to the present invention.

As shown in FIG. 2, hydraulic circuit according to the invention preferably includes the two linear solenoid valves SLS, SLU and a plurality of hydraulic servos. The hydraulic servos 9, 10 engage and disengage a plurality of friction engagement elements (clutches and brakes) to achieve various vehicle speeds. For example, four or five forward speeds and one rear speed, may be achieved by changing over the transmission paths through a planetary gear unit of the automatic shift mechanism.

Input ports $a_1$, $a_2$ of the linear solenoid valves SLS and SLU are supplied with solenoid modulator pressure. According to the output of the hydraulic pressure control means 1c (FIG. 1), the linear solenoid valves SLS, SLU supply control pressure from their output ports $b_1$, $b_2$ to control hydraulic chambers 11a, 12a of pressure control valves 11, 12. Input ports 11b, 12b of the pressure control valves 11, 12 are supplied with line pressure. The pressure regulated by the control pressure from the solenoid valves is supplied from the output ports 11c, 12c to the hydraulic servos 9, 10 via changeover (or shift) valves 13, 15, respectively.

The hydraulic circuit diagram of FIG. 2 is merely for illustration of the basic concept thereof, and the hydraulic servos 9, 10 and the changeover valves 13, 15 are shown for illustrative purposes. As is known, an actual automatic shift mechanism is provided with many hydraulic servos and many changeover valves for switching the hydraulic pressure to the hydraulic servos. In each hydraulic servo, as shown in the hydraulic servo 10, a piston 19 is fitted in a cylinder 16 by an oil-tight seal 17. The piston 19 is moved against the force of a spring 21 to contact outer friction plates 22 with inner friction members 23 in accordance with the regulated pressure applied to a hydraulic chamber 20 by the control valve 12. Although the friction plates and members are shown in the form of a clutch in FIG. 2, it should be understood that a brake may be constructed and operated in a similar manner.

Figure 3:
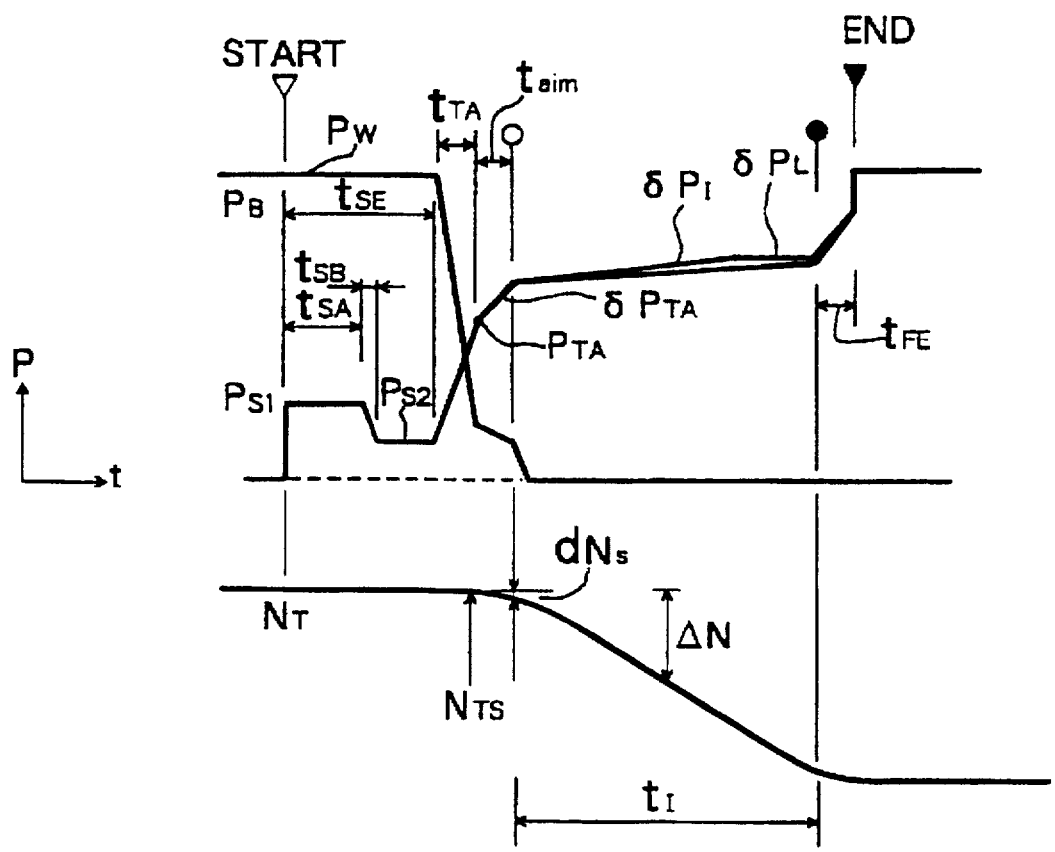
FIG. 3 is a timing chart of an upshift according to the invention.
Figure 4:
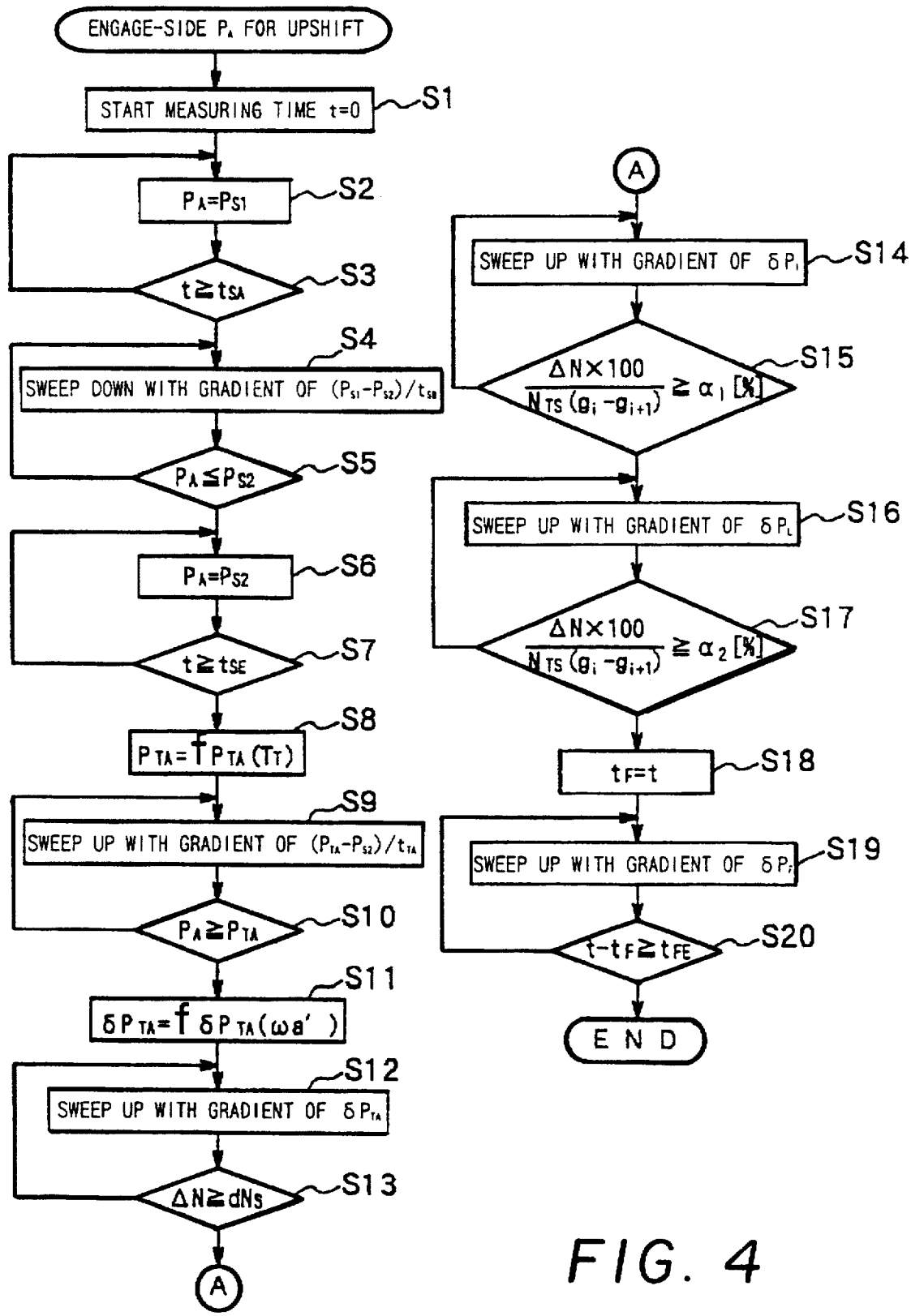
FIG. 4 is a flow chart illustrating the hydraulic pressure control at the engagement-side in an upshift according to the invention.

With reference to FIGS. 3 and 4, the release-side control for a transmission upshift will be now be described. Time measurement for the upshift starts (S1) with time t=0 when the control unit 1 outputs an upshift signal (START) based on the signals from the throttle opening sensor 3 and the vehicle speed sensor 6. The control unit 1 then calculates and outputs a predetermined signal to a linear solenoid valve SLS or SLU so that the hydraulic pressure to an engagement-side hydraulic servo (the engagement-side hydraulic pressure) $P_A$ becomes a predetermined pressure $P_{S1}$ (S2).

The predetermined pressure $P_{S1}$ has been established to a value required to fill the hydraulic chamber 20 of the engagement-side hydraulic servo. The predetermined pressure $P_{S1}$, is maintained for a predetermined time $t_{SA}$. When the predetermined time $t_{SA}$ elapses (S3), the engagement-side hydraulic pressure $P_A$ sweeps down with a predetermined gradient $[(P_{S1}-P_{S2})/t_{SB}]$. When the engagement-side hydraulic pressure $P_A$ becomes a predetermined low pressure $P_{S2}$, (S5), the down-sweep is stopped, and the pressure is held at the predetermined low pressure $P_{S2}$ (S6).

The predetermined low pressure $P_{S2}$ has been established by the control unit so that it remains at the piston stroke pressure, or above, and inhibits rotation changes on the input shaft in any conditions. The predetermined low pressure $P_{S2}$ is maintained until the measured time t indicates the elapse of the predetermined time $t_{SE}$ (S7).

Figure 5A:
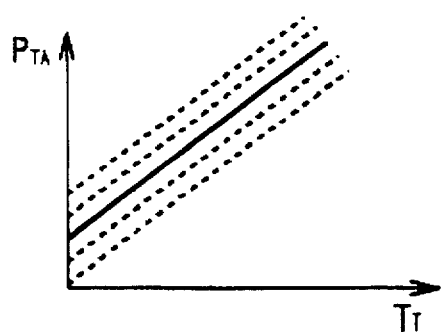
FIG. 5(a) is a graph for calculation of a target hydraulic pressure $P_{TA}$ according to the invention.

The control unit 1 then calculates an engagement-side hydraulic pressure $P_{TA}$ for a condition immediately before the rotation change of the input rotational speed $N_T$ starts (immediately before the inertia phase starts). The pressure $P_{TA}$ is calculated on the basis of a predetermined function $[P_{TA}=F_{PTA}(T_T)]$ that changes with the input torque $T_T$ as indicated in FIG. 5(a) (S8). The target engagement-side hydraulic pressure $P_{TA}$ for a condition immediately before the start of the inertia phase is calculated by first calculating an engagement-side torque $T_A$ (=1/a($T_T$), where a is a torque dividing rate). The engagement-side torque $T_A$ is then used in an equation to determine $P_{TA}$:

$$P_{TA}=(T_A/A_A)+B_A+dP_{TA}$$

where $B_A$ is a piston stroke (=spring load), $A_A$ is [(friction plate effective radius)×(piston area)×(the number of friction plates)×(coefficient of friction)], and $dP_{TA}$ is a hydraulic pressure corresponding to a hydraulic pressure response delay.

Based on the engagement hydraulic pressure $P_{TA}$ calculated corresponding to the input torque $T_T$, for a condition immediately before the start of the inertia phase, the control unit 1 calculates a gradient from a predetermined time $t_{TA}$ $[(P_{TA}-P_{SI})/t_{TA}]$, and sweeps up the engagement-side hydraulic pressure with the calculated gradient (S9). This up-sweep with the relatively small gradient increases the engagement torque so that the hydraulic pressure rises to a level occurring immediately before the input rotational speed starts to change, i.e. to the calculated target engagement hydraulic pressure $P_{TA}$ (S10). This state immediately before the upshift is a torque state where the output shaft torque temporarily falls sharply.

The input torque $T_T$ (=turbine torque) is determined as indicated in FIGS. 6(a) and 6(b) by finding an engine torque corresponding to the throttle opening and the engine speed based on a map with linear interpolation, calculating a speed ratio from the input and output rotational speeds of the transmission, determining a torque ratio corresponding to the speed ratio based on a map, and multiplying the engine torque by the torque ratio.

Figure 5B:
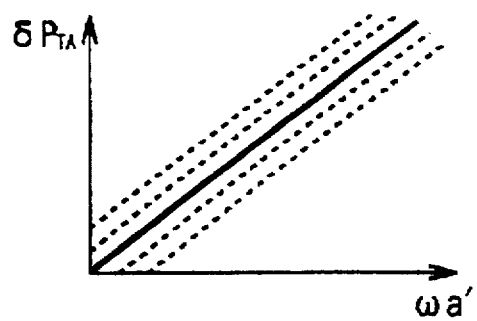
FIG. 5(b) is a graph for calculation of a gradient $\delta P_{TA}$ according to the invention.

When the target engagement hydraulic pressure $P_{TA}$ is reached, i.e. when the hydraulic pressure change is considered to enter the inertia phase in which the rotation change of the input shaft rotational speed starts, the control unit 1 calculates a change $\delta P_{TA}$. This change is calculated using a function $[\delta P_{TA}=f\delta P_{TA}(\omega a')]$ corresponding to the target rotation change rate ($d\omega a/dt$, expressed as $\omega a'$) which is used as a target at the start of rotation change of the input shaft rotational speed $N_T$, as indicated in FIG. 5(b) (S11). More specifically, the hydraulic pressure change $\delta P_{TA}$ is calculated by an equation:

$$\delta P_{TA}=I(\omega a)/k(t_{aim})$$

where k is a constant, $t_{aim}$ is a target shift start time, $\omega a'$ is a target rotation change rate, and I is an inertia amount. The control unit 1 then sweeps up the hydraulic unit with a gradient corresponding to the hydraulic pressure change $\delta P_{TA}$ (S12). This second up-sweep is continued until the rotation change $\Delta N$ from the input shaft rotational speed $N_{TS}$ at the start of the rotation change reaches the shift start-determining rotational speed $dN_S$ (S13).

Figure 5C:
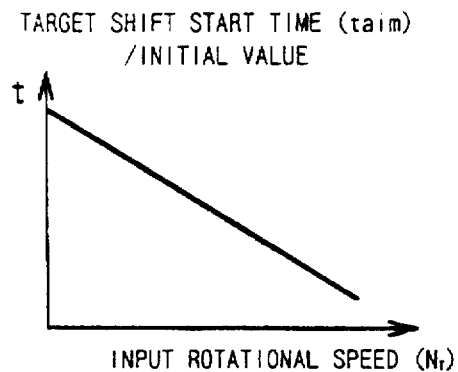
FIG. 5(c) is a graph for calculation of a target shift start time $t_{aim}$ according to the invention.
Figure 5D:
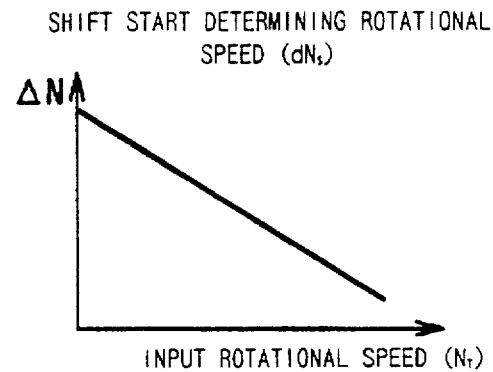
FIG. 5(d) is a graph for calculation of a shift start determining rotational speed $dN_S$ according to the invention.
Figure 5E:
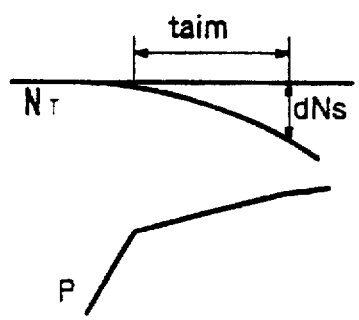
FIG. 5(e) illustrates the shift start-determining rotational speed according to the invention.

The target shift start time $t_{aim}$ is set as a function of the input shaft rotational speed $N_T$ as indicated in FIG. 5(c). The shift start-determining rotational speed $dN_S$ is a minimum rotational speed that provides for detection of a rotational speed change as indicated in FIG. 5(d), and is dependent on the detection precision of the input shaft rotational speed sensor 5. Since the rotation detecting precision deteriorates in a low speed range, the rotational speed for detection needs to be sufficiently high. As the shift start determining rotational speed $dN_S$, increases, the target shift start time $t_{aim}$ also increases as indicated in FIG. 5(e).

The engagement-side hydraulic pressure change $\delta P_I$ is feedback-controlled with a change $\Delta N$ of the rotational speed based on detection of the input shaft rotational speed sensor 5. The control unit 1 then sweeps up the hydraulic pressure with a gradient of $\delta P_I$ (S14). The up-sweep with $\delta P_I$ is continued until $\alpha_1 \%$ (e.g 70%) of the rotation change $\Delta N$ over the completion of the shift is reached (S15), i.e. until $(\Delta N \times 100)/N_{TS}$ $(g_i-g_{i+1})$ becomes $\alpha \%$; where $N_{TS}$ is the input shaft rotational speed, $\Delta N$ is the rotational change, $g_i$ is the gear ratio before the shift, and $g_{i+1}$ is the gear ratio after the shift.

Figure 5F:
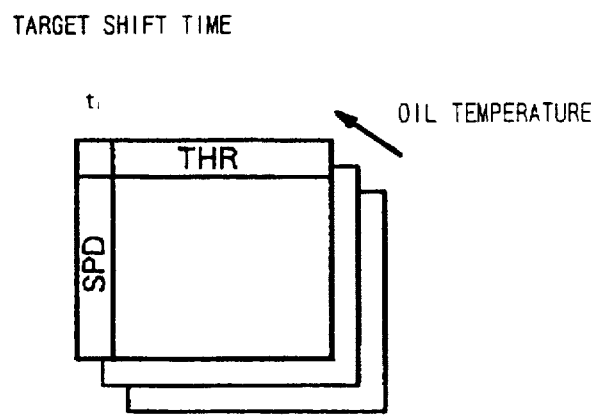
FIG. 5(f) illustrates calculation of a target shift time $t_I$ according to the invention.

When $\alpha_1 \%$ of the rotation change is exceeded, another hydraulic pressure change $\delta P_L$ is set by feedback control based on a smooth input shaft rotational speed change $\Delta N$. The control unit 1 then sweeps up the hydraulic pressure with a gradient of $\delta P_L$ (S16). Generally, the hydraulic pressure change $\delta P_L$ provides a slightly less gradient than the hydraulic pressure change $\delta P_I$. The upsweep with the hydraulic pressure change $\delta P_L$ is continued until $\alpha_2 \%$ (e.g. 90%) of the rotational speed change up to point where the completion of the shift is nearing (S17). The target upsweep shift time $t_I$ with $\delta P_I$ and $\delta P_L$ is set on the basis of a plurality of throttle opening-vehicle speed maps corresponding to different oil temperatures as shown in FIG. 5(f).

When the target shift time $t_I$ elapses, the measured time $t_F$ is set (S18). This state approximately corresponds to a state occurring after the end of the inertia phase. A relatively sharp hydraulic pressure change $\delta P_F$ is then established. The control unit 1 sweeps up the hydraulic pressure sharply with the hydraulic pressure change $\delta P_F$ (S19). When a time $t_{FE}$ set sufficiently for a rise to the engagement pressure elapses following the measured time $t_F$ (S20), the hydraulic pressure control at the engagement side is completed.

Figure 7A:
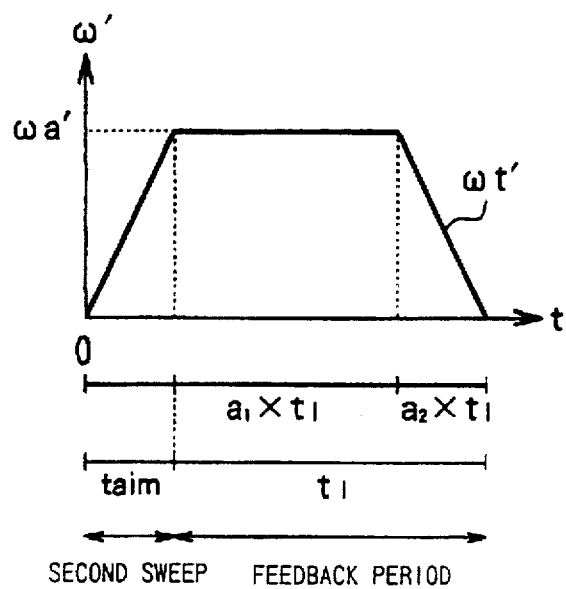
FIG. 7(a) is a graph indicating the rotation change rate according to the invention.

The manner of setting the values $\delta P_{TA}$, $\delta P_I$, and $\delta P_L$ will now be described with reference to FIGS. 7(a) and 7(b). The target rotation change rate $\omega a'$ for the second upsweep based on $\delta P_{TA}$ is calculated on the basis of the target shift start time $t_{aim}$ in accordance with the relation between time t and the time-differentiation (gradient) $\omega'$ of the input shaft rotational speed as indicated in FIG. 7(a). The gradual upsweep based on $\delta P_I$ is roughly fixed to the target rotation change rate $\omega a'$. This fixed state continues for $a_1\%$ (e.g. 70%) of the target shift time $t_f$. Then, during the more gradual upsweep based on $\delta P_L$, the rotation change rate $\omega'$ gradually decreases from the target rotation change rate $\omega a'$. This decreasing state ($\omega t'$) continues for $a_2\%$ (e.g. 30%) of the target shift time $t_f$.

The aforementioned proportions of $\delta P_I$ and $\delta P_L$ are expressed as proportions of $a_1$, $a_2$, and $(a_1+a_2=1)$ of the target shift time $t_f$. The flow chart of FIG. 4, however, expresses the proportions of $\delta P_I$ and $\delta P_L$ by proportions $a_1$, $a_2$ of the rotational speed change $\Delta N$. The two expressions mean substantially the same where the proportions to the entire shift are set.

Figure 7B:
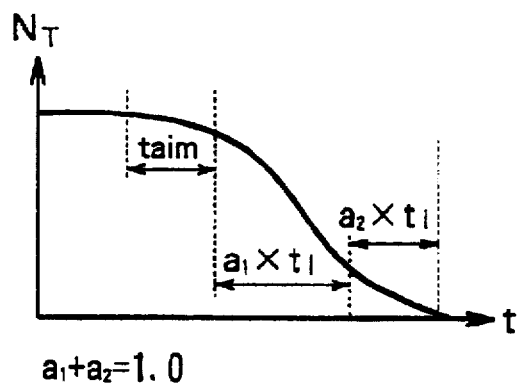
FIG. 7(b) is a graph indicating the change of the rotation of the input shaft according to the invention based on the rotation change rate of FIG. 7(a).

The changes of input shaft rotational speed $N_T$ in the shift beginning period ($t_{aim}$) and the shift ending period ($a_2 \times t_f$) become smooth as indicated in FIG. 7(b) on the basis of the changes of the rotation change rate $\omega'$ indicated in FIG. 7(a). The shift shock is thus reduced. The values of $\delta P_{TA}$, $\delta P_I$, and $\delta P_L$ are set so that the rotation change rate $\omega'$ becomes as described above.

More specifically, since $N_TS(g_i-g_{i+1})/(t_{aim}+t_f)$, $\omega a' \times [(\frac{1}{2}) t_{aim} + a_1 \times t_f + a_2 \times t_f \times (\frac{1}{2})] = N_{TS}(g_i-g_{i+1})/(t_{aim}+t_f)$, therefore, $\omega a' = N_{TS}(g_i-g_{i+1})/[(\frac{1}{2})t_{aim}+a_1 \times t_f+a_2 \times t_f \times (\frac{1}{2})](t_{aim}+t_f)$. Thus, the target rotation change rate is calculated from the target shift start time $t_{aim}$ and the target shift time $t_f$. If $t=t_{aim}$ to $t_{aim}+a_1 \times t_f$, then $\omega t'=\omega a$. If $t=t_{aim}+a_1 \times t_f$ to $t_{aim}+a_1 \times t_f+a_2 \times t_f$, then $\omega t'=\omega a'-(\omega a'/a_2 \times t_f) \times (t-t_{aim}-a_1 \times t_f)$.

The control of the release-side hydraulic pressure $P_B$ for an upshift as described above will be described with reference to FIGS. 3 to 8. Although FIG. 3 indicates the engagement-release simultaneous control, that is, so-called "clutch-to-clutch" control, what is indicated therein also holds for control at the engagement-side alone.

Figure 8:
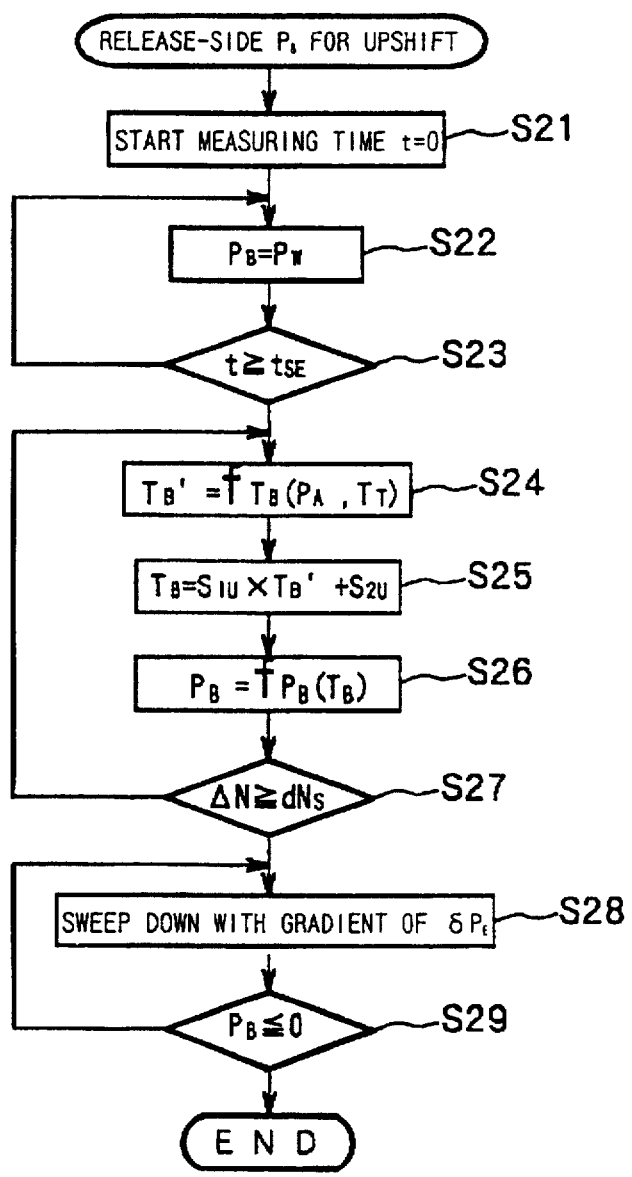
FIG. 8 is a flow chart illustrating the hydraulic pressure control at the release side for an upshift according to the invention.

Referring particularly to the flow chart of FIG. 8, the control unit 1 outputs a shift instruction so that time measurement for the release-side hydraulic pressure control starts simultaneously with that for the engagement-side hydraulic pressure control (S21). A high pressure $P_W$ provided by the engaging pressure is supplied as the release-side hydraulic pressure $P_B$ (S22). The supply of the high pressure $P_W$ is held for a time $t_{SE}$ until the first up-sweep starts (S23).

Figure 9A:
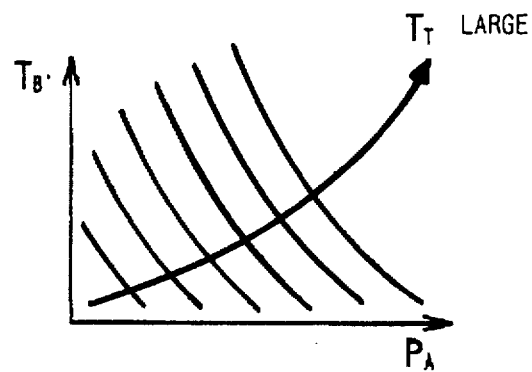
FIG. 9(a) is a graph for calculating the release side hydraulic pressure according to the invention.

The control unit 1 then calculates a release-side torque $T_B'$ using the engagement-side hydraulic pressure $P_A$ and a function $[T_B'=f_{TB}(P_A, T_T)]$ of input torque T, (S24) as shown in FIG. 9(a). The margin rates $S_{1U}$ and $S_{2U}$, are then considered ($T_B=S_{1U} \times T_B'+S_{2U}$), and the release-side torque $T_B$ is calculated (S25). A release-side hydraulic pressure $P_B$ is calculated from the release-side torque $T_B$ $[P_B=f_{PB}(T_B)]$ (S26).

More specifically, the torque $T_A$ divided to the engagement-side friction engaging elements is calculated as $[T_A=A_A \times P_A+B_A]$; where $A_A$ is the (effective radius)×(piston area)×(number of plates)×(coefficient of friction), and $B_B$ is piston stroke pressure. Using the torque $T_A$, the torque $T_B'$ divided to the release-side friction elements is calculated as $[T_B'=(1/b)T_T-(a/b)T_A]$; where b is the release-side torque division, a is the engagement-side torque division, and $T_T$ is input shaft torque. Using the margin rates (tie-up degrees) $S_{1U}$, $S_{2U}$ the control unit 1 sets a tie-up degree with respect to the engagement-side friction elements, with consideration of the drive wheels, and then calculates a release-side torque $T_B$ as $[T_B=S_{1U} \times T_B'+S_{2U}]$.

Figure 9B:
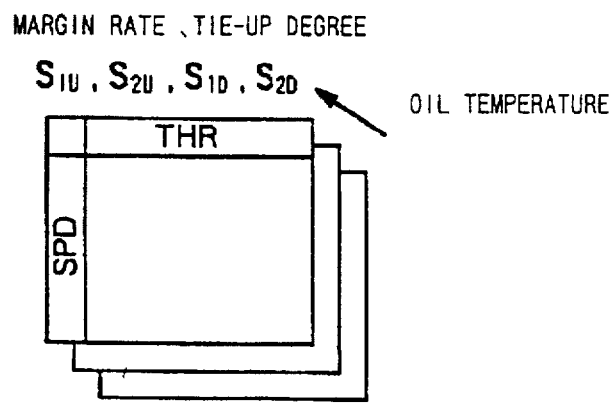
FIG. 9(b) illustrates the calculation of the margin rate according to the invention.

The margin rates $S_{1U}$, $S_{2U}$ are established by a plurality of throttle opening-vehicle speed maps selectively used corresponding to different oil temperatures as shown in FIG. 9(b), so that they agree with the driver's taste. The margin rates are normally set within ranges of $S_{1U}>1.0$, $S_{2U}>0.0$. Furthermore, the control unit 1 calculates from the release-side torque $T_B$ and the margin rates a release-side hydraulic pressure $P_B$ as $[P_B=(T_B/A_B)+B_B]$; where $A_B$ is (the release-side friction element effective radius)×(piston area)× (number of plates)×(coefficient of friction), and $B_B$ is the release-side piston stroke pressure.

Since the down-sweep with the thus-calculated release-side hydraulic pressure $P_B$ is dependent on the engagement-side hydraulic pressure $P_A$, the down-sweep has a two-gradient slope that bends at the start of the inertia phase ($t_{TA}$) at which the input shaft rotational speed starts to change. Thus, the release-side hydraulic pressure $P_B$ includes a relatively steep down-sweep corresponding to the first up-sweep at the engagement side, and a relatively gradual down-sweep corresponding to the second up-sweep at the engagement side. Similarly, the down-sweep at the release side continues until the input shaft rotation change $\Delta N$ becomes the predetermined rotation change start-determining rotational speed $dN_S$ (S27). The control unit 1 then sets a release-side hydraulic pressure change $\delta P_E$, and performs a down-sweep with the set hydraulic pressure change (S28). The down-seep continues until the release-side hydraulic pressure $P_B$ becomes 0 (S29). The hydraulic pressure control at the release side is thus completed.

Figure 10:
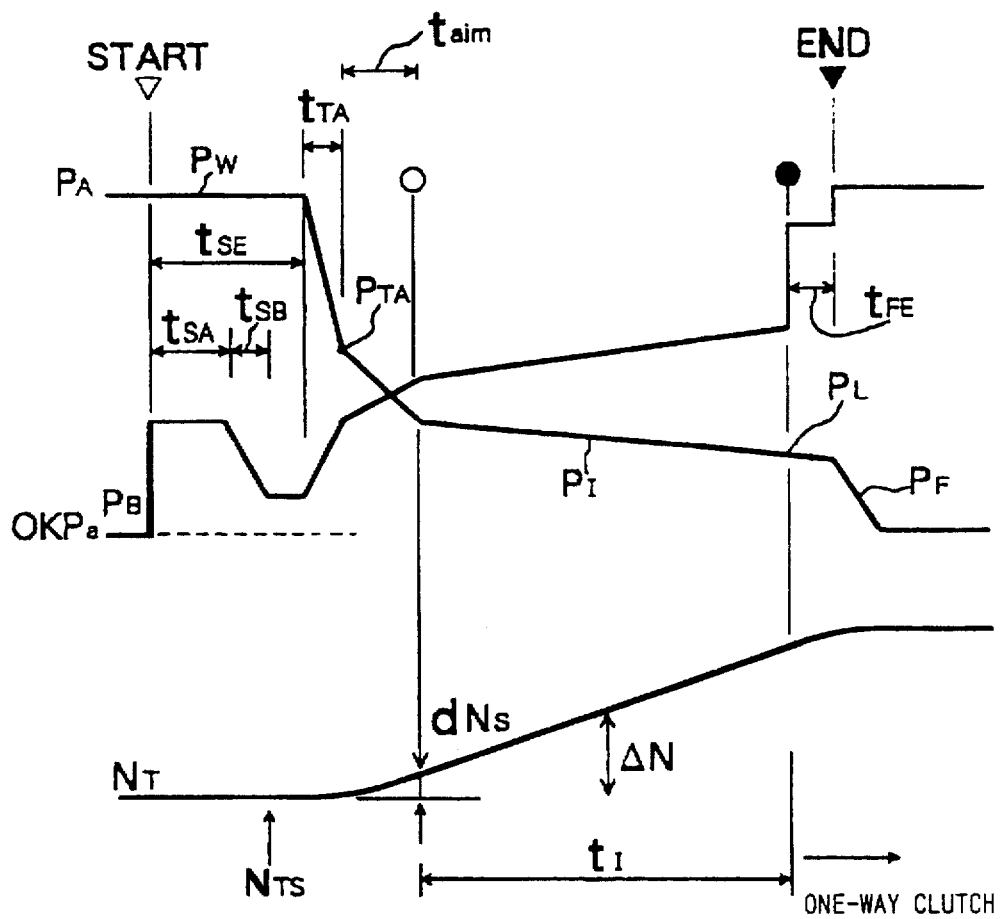
FIG. 10 is a timing chart for a downshift according to the invention.
Figure 11:
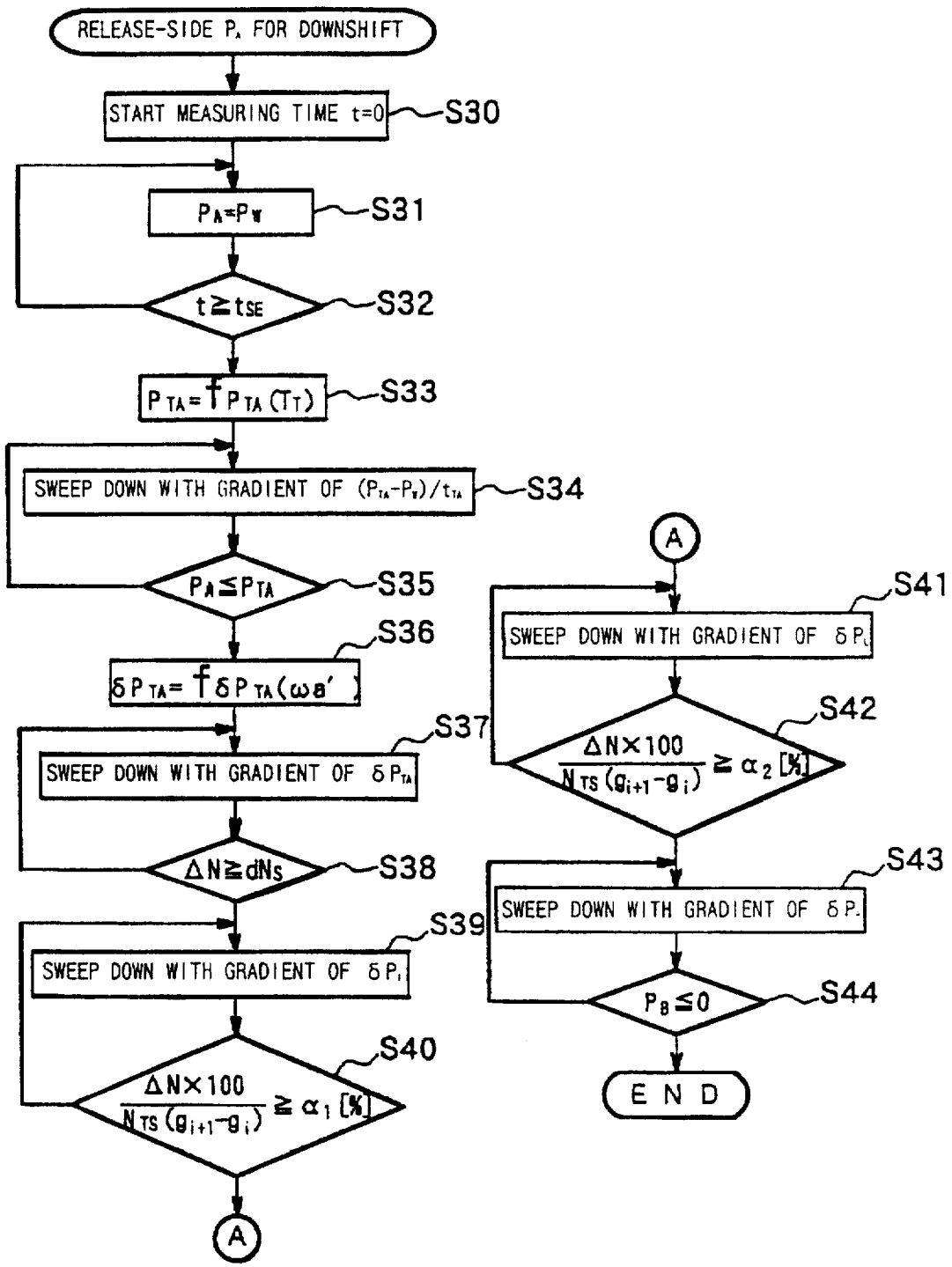
FIG. 11 is a flow chart illustrating the release-side hydraulic pressure control for a downshift according to the invention.

Turning to FIGS. 10 and 11, the control of the release-side hydraulic pressure $P_A$ during a downshift will now be described. For a downshift, the release-side hydraulic pressure is the main object of the control while the engagement-side hydraulic pressure is controlled depending on the release-side hydraulic pressure. This is in contrast to the control for an upshift where the engagement-side hydraulic pressure is the main object of control while the release-side hydraulic pressure is controlled depending on the engagement-side hydraulic pressure, as described above.

As shown in FIG. 11, the control unit 1 first outputs a downshift instruction so that the time measurement starts (S30). The release-side hydraulic pressure $P_A$ is a predetermined engaging pressure $P_W$ (S31). This state of the hydraulic pressure is continued for a predetermined time $t_{sE}$, considering a hydraulic pressure rise time ($t_{SA}+t_{SB}$) (S32). The control unit 1 then calculates a release-side hydraulic pressure $P_{TA}$ occurring when the input shaft rotational speed starts to change (when the inertia phase starts) from the function $[P_{TA}=fP_{TA}(T_T)]$ of the input indicated in FIG. 5(a) (S33). More specifically, the release-side torque $T_A$ is calculated as: $T_A=(1/a)T_T-(b/a)\{S_{2D}/(1+S_{1D}\}$; where $S_{1D}$, $S_{2D}$, are margin rates for downshift.

From the torque $T_A$, a target hydraulic pressure $P_{TA}$ is calculated as $[P_{TA}=(T_A/A_A)+B_A+dP_{TA}]$. The margin rates $S_{1D}$, $S_{2D}$ are selected from a map as indicated in FIG. 8(b). They are normally set within ranges of $S_{1D}<1.0$, $S_{2D}>0.0$. The control unit 1 then determines a gradient to the target hydraulic pressure $P_{TA}$ based on a predetermined time $t_{TA}$ as

[$(P_{TA}-P_W)/t_{TA}$], and performs a first down-sweep with the gradient (S34). The first down-sweep is a relatively steep down-sweep, and continues until the release-side hydraulic pressure $P_A$ becomes the target hydraulic pressure $P_{TA}$ immediately before the start of the inertia phase (S35).

The control unit 1 then calculates a release-side hydraulic pressure change $\delta P_{TA}$ based on the function [$\delta P_{TA}=f\delta_{PTA}$ ($\omega a'$)], as indicated in FIG. 5(b) (S36). More specifically, the hydraulic pressure change $\delta P_{TA}$ is calculated as [$\delta P_{TA}=(I/k)$ ($\omega a/t_{aim}(1+S_{1D})$)]. The control unit 1 then performs a second down-sweep with the gradient of the hydraulic pressure change $\delta P_T$ (S37). The down-sweep continues from the input shaft rotational speed $N_{TS}$, occurring before the shift starts, to the shift start determining rotational speed $dN_S$, at which a rotation change $\Delta N$ is detected with a predetermined precision (S38). The second down-sweep continues until the target shift start time $t_{aim}$ has a more gradual gradient than the first down-sweep.

Then the control unit 1 performs the down-sweep with the gradient of a predetermined hydraulic change $\delta P_f$, by feedback control while detecting a rotational speed change $\Delta N$ based on the detection by the input shaft rotational seed sensor. The down-sweep is continued until the rotational speed change reaches $\alpha_1\%$ of the total rotational speed change up to the completion of the shift (S40). After that, a down-sweep with a more gradual gradient of the hydraulic pressure change $\delta P_L$ is performed by similar feedback control (S41). This down-sweep is continued until $\alpha_2\%$ of the total rotational speed change is reached.

After the completion of the shift up to $\alpha_2\%$ the control unit 1 sets a hydraulic pressure change $\delta P_F$ having a relatively steep gradient, and performs a down-sweep with the gradient (S43). When the release-side hydraulic pressure $P_B$ becomes 0, the release-side hydraulic pressure control for the downshift is completed (S44).

Figure 12:
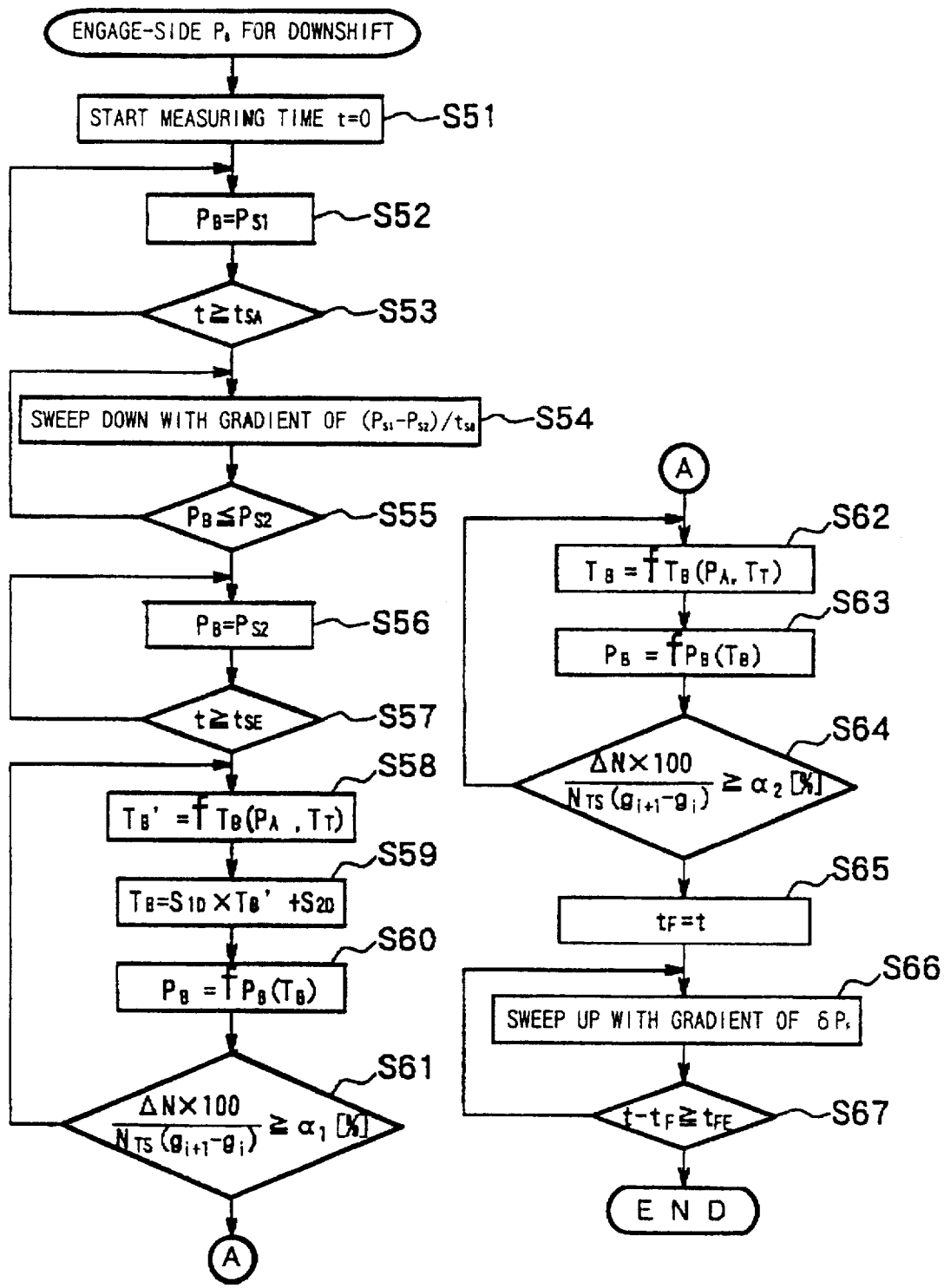
FIG. 12 is a flow chart illustrating the engagement-side hydraulic pressure control for a downshift according to the invention.

The control of the engagement-side hydraulic pressure $P_B$ for a downshift will now be described with reference to FIGS. 10 and 12. The initial control steps S51–S57 are the same as steps S1–S7 of the engagement-side hydraulic pressure control during an upshift, and will not be described again.

When the control enters the torque phase after the initial control steps, the control unit 1 calculates an engagement-side torque $T_B'$ based on the release-side hydraulic pressure $P_A$ and a function [$T_B'=f_{TB}(P_A, T_T)$] of input torque (S58), as indicated in FIG. 9(a). Then, considering the margin rates, the control unit 1 calculates an engagement-side torque $T_B$ as [$T_B=S_{1D}\times T_B'+S_{2D}$] (S59). From the engagement-side torque $T_B$, an engagement-side hydraulic pressure $P_B$ is calculated as [$P_B=f_{PB}(T_B)$] (S60).

More specifically, the engagement-side hydraulic pressure $P_B$ is calculated as [$T_A=A_A\times P_A+B_A$]→[$T_B'=(1/b)T_T-(a/b)T_A$]→[$T_B=S_{1D}\times T_B'+S_{2D}$]→[$P_B=(T_B/A_B)+B_B$] as in the calculation of the release-side hydraulic pressure for an upshift. Since the hydraulic pressure $P_B$ is dependent on the release-side hydraulic pressures based on the first down-sweep, the second down-sweep, and the down-sweep with $\delta P_f$, the hydraulic pressure $P_B$, undergoes the first up-sweep with a relatively steep gradient, the second up-sweep with a relatively gradual gradient, and the third up-sweep with a more gradual gradient corresponding to $\delta P_f$. The hydraulic pressure $P_B$ continues up to $\alpha_1\%$ of the total input shaft rotational speed change (S61).

The changeover of engagement of the friction engagement elements is nearly completed when $\alpha_1\%$ (e.g 70%) of the total input shaft rotational speed change is reached. For the remaining control process, the control unit 1 calculates an engagement-side torque $T_B$ [$T_B=f_{TB}(P_A, T_T)$] (S62), and performs control based on the engagement-side hydraulic pressure $P_B$ [$=f_{PB}(T_B)$] determined from the engagement side torque $T_B$ without involving margin rates (S63). More specifically, the engagement-side hydraulic pressure $P_B$ that does not involves margin rates (tie-up degrees) is calculated as [$T_A=A_A\times P_A+B_B$]→[$T_B'=(1/b)(T_T)-(a/b)T_A$]→[$P_B=(T_B/A_B)+B_B$]. Control is performed based on the engagement-side hydraulic pressure $P_B$ dependent on the release-side hydraulic pressure, until $\alpha_2\%$ (e.g. 90%) of the total input shaft rotational speed change is reached (S64).

The time $t_F$ at the completion of $\alpha_2\%$ is stored (S65). Then, the up-sweep with a relatively steep hydraulic pressure change $\delta P_F$ is performed (S65). When a predetermined time $t_{FE}$ corresponding to the engagement of a one-way clutch elapses after the target set time $t_f$, which is set based on a map as indicated in FIG. 5(f), for example, the engagement-side hydraulic pressure control for the downshift is completed (S67).

Figure 13A:
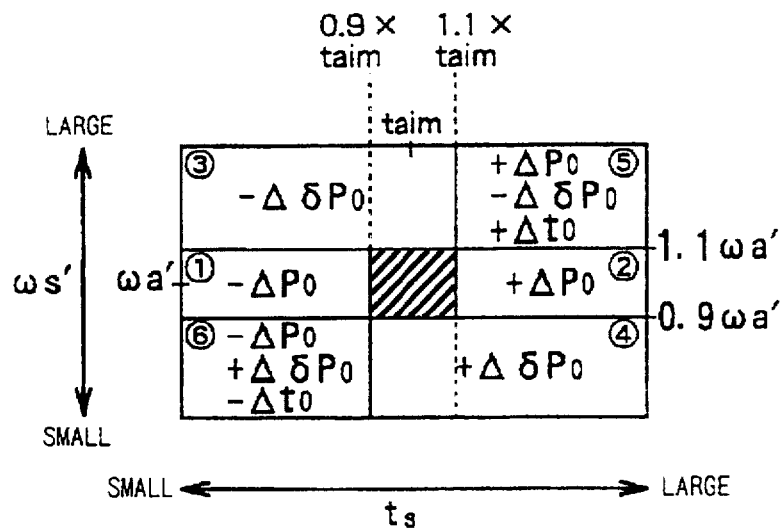
FIG. 13(a) shows correction values for various states of the shift control according to the invention.
Figure 13B:
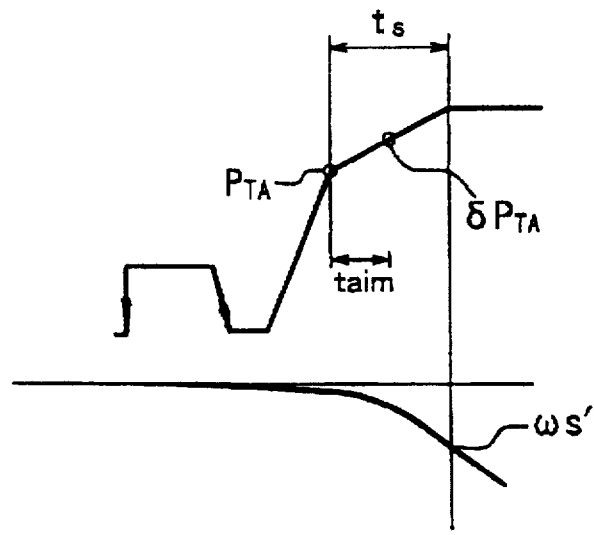
FIG. 13(b) illustrates a correction based on the values shown in FIG. 13(a).
Figure 14A:
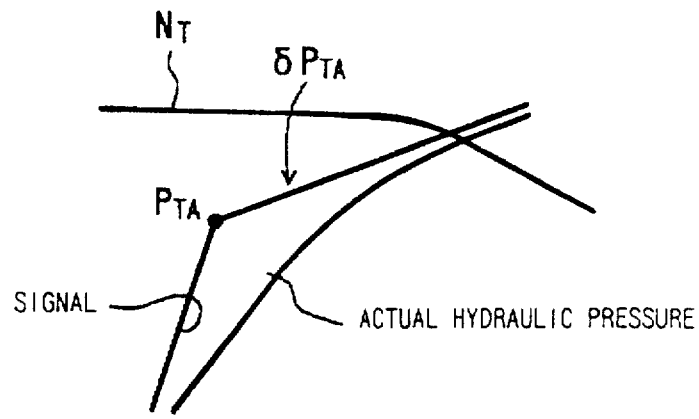
FIG. 14(a) indicates a state before correction for a hydraulic pressure response delay according to the invention.
Figure 14B:
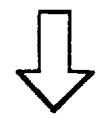
FIG. 14(b) indicates a state after correction for a hydraulic pressure response delay according to the invention.
Figure 14B:
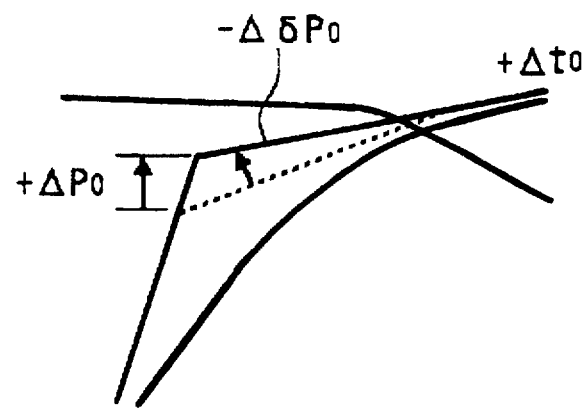

Turning now to FIGS. 13 and 14, if a permissible range of $0.9\times t_{aim}$ to $1.1\times t_{aim}$ is set with respect to the target shift start time $t_{aim}$, and a permissible range of 0.9 $\omega a'$ to 1.1 $\omega a'$ is set with respect to the target rotation change rate $\omega a'$, as shown in FIG. 13(a), there exist patterns 1 to 6 outside the permissible range (the shadowed central section). As shown in FIG. 13(b), if the target hydraulic pressure $P_{TA}$ for the time of start of the input shaft rotation change (start of the inertia phase) is corrected to [$P_{TA}=P_{TA}+\Delta P_0$], the gradient $\delta P_{TA}$ of the second up-sweep (or down-sweep) is corrected to [$\delta P_{TA}=\delta P_{TA}+\delta \Delta P_0$], and the target shift start time $t_{aim}$ is corrected to [$t_{aim}=t_{aim}+\Delta t_0$], then the values $\Delta P_0$, $\delta \Delta P_0$, and $\Delta t_0$ are corrected as indicated in patterns 1 to 6.

If the engaging force occurring with respect to the hydraulic pressure is made too large or too small by variations in the piston stroke, the return spring load, the friction coefficients and the like, the control unit 1 corrects the hydraulic pressure $P_{TA}$ for a condition immediately before the start of the second sweep ($\Delta P_0$). More specifically, if the rotation change rate $\omega s'$ is within the permissible range (0.9 $\omega a' \leq \omega s' \leq 1.1$ $\omega a'$), and the time before the start of shift is short ($t_S<0.9$ $t_{aim}$), then the target hydraulic pressure $P_{TA}$ is corrected to a reduced level ($P_{TA}=P_{TA}-\Delta P_0$), as shown in pattern 1. If the rotation change rate $\omega s'$ is within the permissible range and the time before the start of shift is long ($t_S>1.1$ $t_{aim}$), then the target hydraulic pressure $P_{TA}$ is corrected to an increased level ($P_{TA}=P_{TA}+\Delta P_0$), as shown in pattern 2. The time $t_S$ is calculated as [$t_S=t_{TE}-t_{TS}$]; where $t_{TS}$ is the time at which the hydraulic pressure $P_A$ becomes the target hydraulic pressure $P_{TA}$, and $t_{TE}$ is the time at which the rotation change $\Delta N$ becomes detectable ($\Delta N \geq dN_S$). From the equation $P_{TA}=(T_A/A_A)+B_A+dP_{TA}$, corrected hydraulic pressures at the engagement-side and release-side friction engagement elements are calculated. Then an average of number n of such calculated values is calculated to determine a corrected hydraulic pressure.

If the rotation change is made too large or too small with respect to the hydraulic pressure change (increase or decrease) by variations in the inertia (I) amount, the friction coefficients and the like, the control unit 1 corrects the sweep gradient $\delta P_{TA}$ ($\Delta \delta P_0$). More specifically, after determining the rotation change rate $\omega s'$ occurring when the input shaft rotational speed change becomes the rotation change start-determining rotational speed, if 1.0 $\omega a'<\omega s'$ and $t_S \leq 1.1$ $t_{aim}$, then the sweep gradient is corrected to a more gradual gradient ($\delta P_{TA}=\delta P_{TA}-\Delta \delta P_0$), as shown in pattern 3. If 0.9 $\omega a'>\omega s$ and $t_S>0.9$ $t_{aim}$, then the sweep gradient is corrected to a steeper gradient ($\delta P_{TA}=\delta P_{TA}+\Delta \delta P_{TA}$), as shown in pattern 4. The inertia amount I is corrected using the aforementioned equation $[\delta P_{TA}=(I/A_A*a)*(\omega a'/t_{aim})]$. An average of number n of such values is calculated to determine a corrected value.

If both the rotation change rate $\omega s'$ and the target time $t_S$ become outside the permissible ranges because of a too large or too small hydraulic pressure response delay, the control unit 1 corrects the aforementioned sweep initial pressure $P_{TA}$, sweep gradient $\delta P_{TA}$, and target shift start time $t_{aim}$ ($\Delta P_0$, $\Delta \delta P_0$, $\Delta t_0$). If $1.1\,\omega a'<\omega s$ and $t_S>1.1\,t_{aim}$, the control unit 1 corrects the initial pressure $P_{TA}$ to an increased level, the sweep gradient $\delta P_{TA}$ to a reduced value, and the target time $t_{aim}$ to an increased time ($P_{TA}=P_{TA}+\Delta P_0$, $\delta P_{TA}=\delta P_{TA}-\Delta \delta P_0$, $t_{aim}=t_{aim}+\Delta t_0$), as shown in pattern 5. If $0.9\,\omega a'>\omega s'$ and $t_S<0.9\,t_{aim}$, the control unit 1 corrects the initial pressure $P_{TA}$ to an increased level, the sweep gradient $\delta P_{TA}$ to an increased value, and the target time $t_{aim}$ to a shortened time ($P_{TA}=P_{TA}-\Delta P_0$, $\delta P_{TA}=\delta P_{TA}+\Delta \delta P_0$, $t_{aim}=t_{aim}-\Delta t_0$), as shown in pattern 6.

In patterns 5 and 6, based on the hydraulic pressure response delay, control is performed considering a hydraulic pressure response delay as well as the target time $t_{aim}$. If the hydraulic pressure response delay is not considered, repeated calculation of target times $t_{aim}$ will only fail to achieve a target time within a range of the shadowed central section. If the signal value from the control unit 1 has risen to the initial pressure $P_{TA}$ and an up-sweep with a sweep gradient Of $\delta P_{TA}$ has been instructed, as indicated in FIG. 13(a), then the control unit 1 corrects the initial pressure $P_{TA}$ to an increased level ($+\Delta P_0$) if a hydraulic pressure response delay ($d_{PTA}$) is large and causes a slow rise of the actual hydraulic pressure. Correspondingly, the control unit 1 corrects the sweep gradient $\delta P_{TA}$ to a reduced value ($-\Delta \delta P_0$) and corrects the target time $t_{aim}$ to an increased time ($\Delta t_0$). The control unit 1 then determines a corrected value based on an average of number n of values as described above.

If the piston stroke does not reach a predetermined value or it exceeds the value before the first sweep starts (i.e. if the conditions are outside what are covered by the table of FIG. 13(a)) correction is performed by determining the first fill time $t_{SE}$. If $\omega s'>\omega_{max}$ and $(t_{TE}-t_{TS})\geq t_{Smax}$, where $t_{TS}$ is time at which the hydraulic pressure $P_A$ becomes the sweep initial pressure $P_{TA}$ ($P_A=P_{TA}$), and $t_{TE}$ is time at which the input shaft rotational speed $\Delta N$ becomes the change start-determining rotational speed $dN_S$ ($\Delta N \geq dN_S$), and $\omega s'$ is the rotation change rate at the time $t_{TE}$, the correction is performed in such a direction that the time $t_{SE}$ up to the start of the first sweep will increase ($t_{SE}=t_{SE}+\Delta t_{SE0}$). If $t_{TE}\leq t_{SE}$, the correction is performed in such a direction that the time $t_{SE}$ will decrease ($t_{SE}=t_{SE}-\Delta t_{SE0}$). In the aforementioned equations, $W'_{max}$ is a predetermined maximum rotation change rate, and $t_{Smax}$ is a predetermined maximum time for the second sweep.

There is thus provided, according to the present invention, a hydraulic pressure control apparatus for an automatic transmission wherein the hydraulic pressure shifts from the first sweep section to the second sweep section with a relatively small gradient as the inertia phase starts. The control apparatus quickly starts a shift and smoothes the torque fluctuation during the shift, thus preventing a shift shock or a prolonged shift process, that would otherwise be caused by an excessively high or low hydraulic pressure.

The gradient of the first sweep section is established on the basis of a predetermined time set in consideration of a hydraulic pressure response delay. The control apparatus is able to reduce the errors caused by the response delay of hydraulic pressure and control the second sweep section that follows. Since the gradient of the second sweep section is set using as a target value the rotation change rate occurring when the input rotational speed changes by a predetermined amount, the control apparatus improves the follow-up of the actual rotation change rate to the target value. Precise hydraulic pressure control is thus achieved without causing shift shocks.

Also, since the second sweep section continues until the actual rotational speed change becomes the rotation change start determining rotational speed, the control apparatus is able to always detect the rotational speed with a high precision regardless of input rotational speeds. Precise feedback correction control is thus achieved.

Since the rotational speed changes in the beginning and ending periods of the inertia phase are smoothed, and since variations in the time of the second sweep section are corrected by determining a target hydraulic pressure of the first sweep section, the control apparatus reduces shift shocks and improves the shift feel. Shift shocks are also reduced by the control apparatus by correcting variations in the rotation change rate during the second sweep section through correction of the gradient of the first sweep section. Moreover, since the predetermined time is established in consideration of the hydraulic pressure response delay, the control apparatus performs appropriate corrections even if the hydraulic pressure response delay is too large or too small.

According to the present invention the control apparatus is also able to determine and control the piston stroke time, even if the piston stroke achieved before the start of the first sweep section is shorter or longer than a predetermined stroke. A hydraulic pressure response delay and shift shocks at the start of the inertia phase are thus prevented despite an excessively short or long piston stroke.

Also, since a second one of the hydraulic servos for the friction engagement elements is controlled depending on the hydraulic pressure control of the first one of the hydraulic servos, the control apparatus simplifies the hydraulic pressure control by simultaneously switching over the friction engagement elements (i.e. by performing "clutch-to-clutch" changeover). This reduces the required memory capacity of the control along with the associated cost thereof. Furthermore, since the relation between the engagement-side and release-side hydraulic pressure servos is maintained in a predetermined state, the control apparatus prevents shift shocks that would otherwise be caused by engine speed rise or tie-up resulting from improper independent setting of hydraulic pressures. Also, since the tie-up degree can be changed merely by changing the predetermined coefficient, the control apparatus facilitates the calibration, increases the freedom in varying the predetermined coefficient, and enables appropriate control that agrees with the driver's tastes (for example, appropriate feel caused by throttle changes with a fixed input torque).

The embodiments which have been described herein are but some of the several which utilize this invention and are set forth here by way of illustration but not of limitation. It is obvious that many other embodiments which will be readily apparent to those skilled in the art may be made without departing materially from the spirit and scope of this invention.

What is claimed is:

1. A hydraulic pressure control apparatus for controlling an automatic transmission of a vehicle comprising:

an automatic shift mechanism for changing a transmission input shaft rotational speed over transmission paths by engaging and disengaging a plurality of friction engagement elements through operation of hydraulic servos, said automatic shift mechanism providing output rotation to a wheel of said vehicle;

a changeover valve that switches to supply hydraulic pressure to or discharge it from at least one of said hydraulic servos to engage and disengage at least one of said friction engagement elements;

at least one pressure regulator for regulating said hydraulic pressure to said hydraulic servos; and a control unit for controlling regulation of said hydraulic pressure by said pressure regulator, said control unit comprising:

input torque calculation means for calculating an input torque of said input shaft to said automatic shift mechanism based on a running condition of said vehicle, target hydraulic pressure calculation means for calculating a target hydraulic pressure in accordance with the input torque, for a condition immediately before said input rotational speed starts to change, and hydraulic pressure control means for outputting a signal to said pressure regulator to provide a first sweep section where said hydraulic pressure is changed to said target hydraulic pressure with a pretermined first gradient, and a second sweep section where said hydraulic pressure is changed from said target hydraulic pressure with a second gradient that is less than the predetermined first gradient.

2. A hydraulic pressure control apparatus according to claim 1, wherein said first sweep section is provided for a predetermined time established in consideration of a hydraulic pressure response delay, and said predetermined first gradient is established on the basis of said predetermined time and said target hydraulic pressure.

3. A hydraulic pressure control apparatus according to claim 1, said apparatus further comprising means for determining input rotational speed, and wherein said second gradient of said second sweep section is established on the basis of a target rotation change rate that occurs when said input rotational speed changes by a predetermined amount.

4. A hydraulic pressure control apparatus according to claim 1, said apparatus further comprising means for determining input rotational speed, and wherein said second sweep section extends until a rotational speed change of said input shaft becomes a rotation change start-determining rotational speed.

5. A hydraulic pressure control apparatus according to claim 1, said apparatus further comprising means for determining input rotational speed, and wherein in an inertia phase, said hydraulic pressure control apparatus uses as a target value a rotation change rate of said input rotational speed, and wherein said hydraulic pressure control means is set so that said target value gradually changes during beginning and ending periods of said inertia phase.

6. A hydraulic pressure control apparatus according to claim 4, wherein said hydraulic pressure control apparatus measures the duration of said second sweep section, and corrects said target hydraulic pressure in accordance with the measured duration.

7. A hydraulic pressure control apparatus according to claim 4, wherein said hydraulic pressure control apparatus detects a rotational speed change rate of said input rotational speed at an end of said second sweep section, and corrects said second gradient of said second sweep section in accordance with the detected change rate.

8. A hydraulic pressure control apparatus according to claim 4, wherein said hydraulic pressure control apparatus compares the duration of said second sweep section with the predetermined time established in consideration of a hydraulic pressure response delay, and corrects said target hydraulic pressure and said second gradient of said second sweep section based on the comparison.

9. A hydraulic pressure control apparatus according to claim 4, wherein said hydraulic pressure control apparatus supplies said hydraulic pressure to said hydraulic servos so that said hydraulic servos will complete a piston stroke before said first sweep section starts, and wherein said hydraulic pressure control apparatus detects a rotational speed change rate of said input rotational speed and the duration of said second sweep section at an end of said second sweep section, and corrects a piston stroke time of said hydraulic servos in accordance with the detected rotational speed change rate and the detected time.

10. A hydraulic pressure control apparatus according to claim 1, wherein said friction engagement elements include two friction engagement elements that are simultaneously operated, a first of said friction engagement elements being operated by a first hydraulic servo supplied by said hydraulic pressure, and a second of said friction engagement elements being operated by a second hydraulic servo supplied by a second hydraulic pressure, said second hydraulic pressure being controlled on the basis of a predetermined relational equation that depends on said hydraulic pressure supplied the first hydraulic servo.

11. A hydraulic pressure control apparatus according to claim 10, wherein said relational equation is related to a predetermined coefficient established in accordance with a tie-up degree of said first and second friction engagement elements.

* * * * *

UNITED STATES PATENT AND TRADEMARK OFFICE
CERTIFICATE OF CORRECTION

PATENT NO. : 5,782,711
DATED : July 21, 1998
INVENTOR(S) : TSUTSUI et al

It is certified that error appears in the above-indentified patent and that said Letters Patent is hereby corrected as shown below:

IN THE DRAWINGS:  Fig. 1, the number designating the "DRIVE WHEELS" should be changed from "33" to --37--.

Col. 1, line 35, delete "of" insert --in--.

Col. 3, line 67, delete "an" insert --a-- and "valves" should read --valve--.

Col. 4, line 1, delete "37" and insert --35--;
       line 2, delete "valves" and insert --valve--;
       line 3, delete "37" and insert --35--; and
       line 8, delete "35" and insert --37--.

Signed and Sealed this

Twenty-fifth Day of May, 1999

Attest:

Q. TODD DICKINSON

Attesting Officer

Acting Commissioner of Patents and Trademarks